US008826652B2

(12) United States Patent
Gonze et al.

(10) Patent No.: US 8,826,652 B2
(45) Date of Patent: Sep. 9, 2014

(54) POWER SYSTEM AND METHOD FOR ENERGIZING AN ELECTRICALLY HEATED CATALYST

(75) Inventors: Eugene V. Gonze, Pinckney, MI (US); Charles E. Solbrig, Ypsilanti, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 13/304,802

(22) Filed: Nov. 28, 2011

(65) Prior Publication Data

US 2013/0133307 A1     May 30, 2013

(51) Int. Cl.
*F01N 3/10*     (2006.01)

(52) U.S. Cl.
USPC .............................................. 60/300; 60/303

(58) Field of Classification Search
CPC ............... F01N 3/00; F01N 3/10; F01N 3/28; F02N 11/06; G01N 27/416; F02P 17/00; B60K 13/00
USPC ............. 60/286, 284, 274, 300, 303; 701/102
See application file for complete search history.

(56) References Cited

U.S. PATENT DOCUMENTS

| 5,345,761 A * | 9/1994 | King et al. ................... 60/274 |
| 5,994,787 A * | 11/1999 | Hibino ........................ 307/10.1 |
| 6,362,535 B1 * | 3/2002 | Tilyou et al. ................ 290/40 C |
| 6,381,955 B1 * | 5/2002 | Morganti et al. ............... 60/300 |
| 7,469,532 B2 | 12/2008 | Williamson et al. |
| 7,594,940 B2 | 9/2009 | Gonze et al. |
| 7,686,857 B2 | 3/2010 | Gonze et al. |
| 7,691,339 B2 | 4/2010 | Ament et al. |
| 7,810,318 B2 | 10/2010 | Gonze et al. |
| 7,862,635 B2 | 1/2011 | Gonze et al. |
| 7,877,987 B2 | 2/2011 | Gonze et al. |
| 7,886,529 B2 | 2/2011 | Gonze et al. |
| 7,901,475 B2 | 3/2011 | Gonze et al. |
| 7,931,715 B2 | 4/2011 | Gonze et al. |
| 7,931,727 B2 | 4/2011 | Gonze et al. |
| 7,958,723 B2 | 6/2011 | Gonze et al. |
| 7,975,469 B2 | 7/2011 | Gonze et al. |
| 7,981,198 B2 | 7/2011 | Gonze et al. |
| 8,029,582 B2 | 10/2011 | Gonze et al. |
| 8,037,673 B2 | 10/2011 | Gonze et al. |
| 8,051,644 B2 | 11/2011 | Gonze et al. |
| 8,057,581 B2 | 11/2011 | Gonze et al. |

* cited by examiner

*Primary Examiner* — Thomas Denion
*Assistant Examiner* — Kelsey Stanek
(74) *Attorney, Agent, or Firm* — Cantor Colburn LLP

(57) ABSTRACT

A power system and a method for energizing an electrically heated catalyst are provided. The system includes a controller that generates a first control signal to set a switching device to a first operational state if the first temperature level downstream of the catalyst is less than a threshold temperature level and the engine is being decelerated. The controller further generates a second control signal to induce a generator to output a second voltage if the first temperature level is less than the threshold temperature level and the engine is being decelerated, such that the second voltage is applied through the switching device in the first operational state to the catalyst to increase a temperature of the catalyst.

16 Claims, 4 Drawing Sheets

POWER SYSTEM AND METHOD FOR ENERGIZING AN ELECTRICALLY HEATED CATALYST

FIELD OF THE INVENTION

Exemplary embodiments of the invention relate to a power system and a method for energizing an electrically heated catalyst in a vehicle.

BACKGROUND

Internal combustion powered vehicles have utilized a late injection of fuel in engine cylinders to increase a temperature of emission catalysts downstream of the engine. However, utilizing a late injection of fuel for emission improvement purposes disadvantageously decreases fuel economy of the vehicle.

SUMMARY OF THE INVENTION

In an exemplary embodiment of the invention, a power system for energizing an electrically heated catalyst is provided. The electrically heated catalyst is disposed downstream of an engine and upstream of an oxidation catalyst. The power system includes a battery configured to output a first voltage. The power system further includes a generator selectively coupled through a switching device to either the battery or the electrically heated catalyst. The power system further includes a controller configured to generate a first control signal to set the switching device to a first operational state if a first temperature level downstream of the electrically heated catalyst is less than a threshold temperature level and the engine is being decelerated. The controller is further configured to generate a second control signal to induce the generator to output a second voltage if the first temperature level is less than the threshold temperature level and the engine is being decelerated, such that the second voltage is applied through the switching device in the first operational state to the electrically heated catalyst to increase a temperature of the electrically heated catalyst.

In another exemplary embodiment of the invention, a method for energizing an electrically heated catalyst is provided. The electrically heated catalyst is disposed downstream of an engine and upstream of an oxidation catalyst. The method includes outputting a first voltage from a battery. The method includes generating a first control signal utilizing a controller to set a switching device to a first operational state if a first temperature level downstream of the electrically heated catalyst is less than a threshold temperature level and the engine is being decelerated. The method further includes generating a second control signal utilizing the controller to induce a generator to output a second voltage if the first temperature level is less than the threshold temperature level and the engine is being decelerated, such that the second voltage is applied through the switching device in a first operational state to the electrically heated catalyst to increase a temperature of the electrically heated catalyst.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
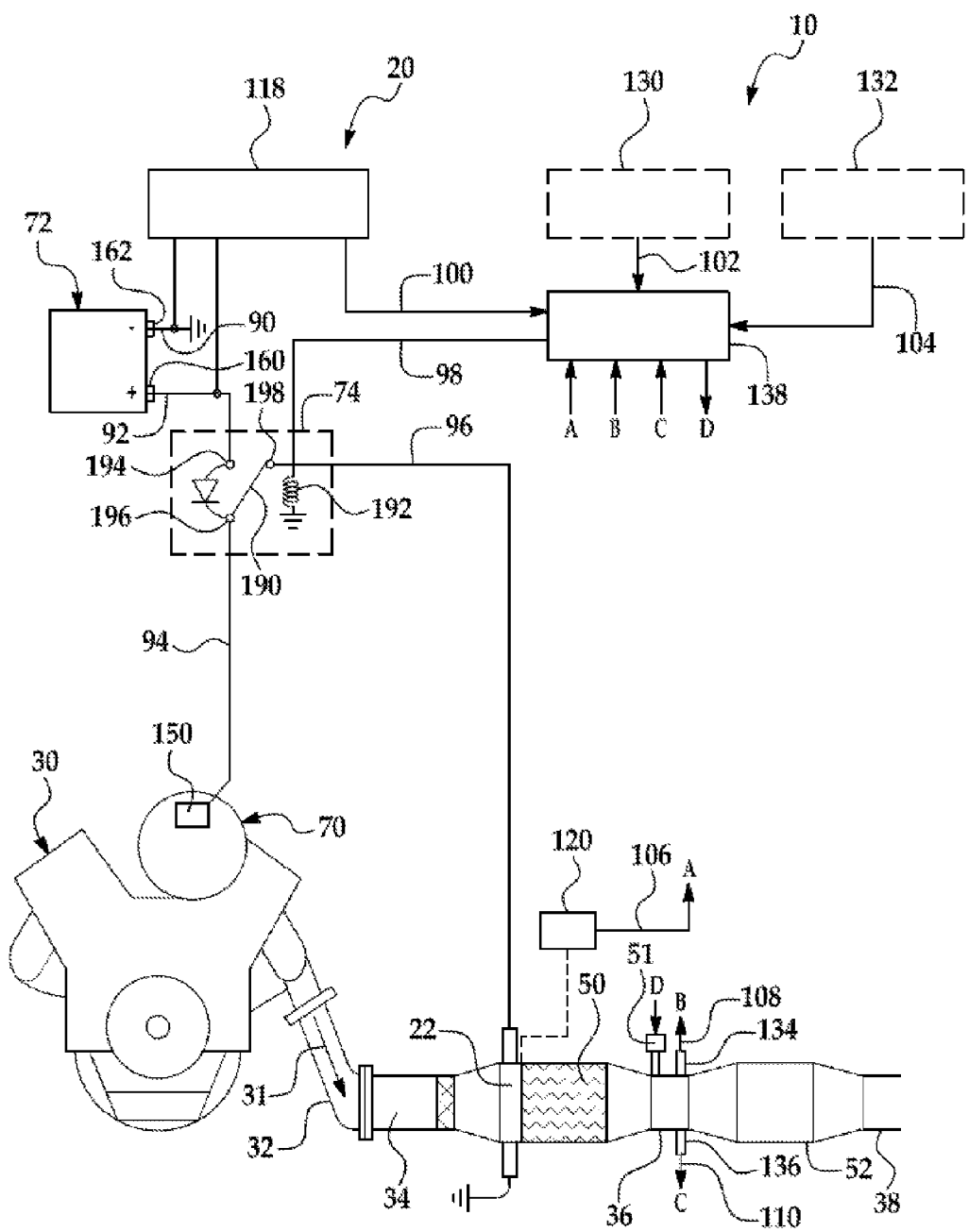
FIG. 1 is a schematic view of a vehicle having a power system for energizing an electrically heated catalyst in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

Figure 2:
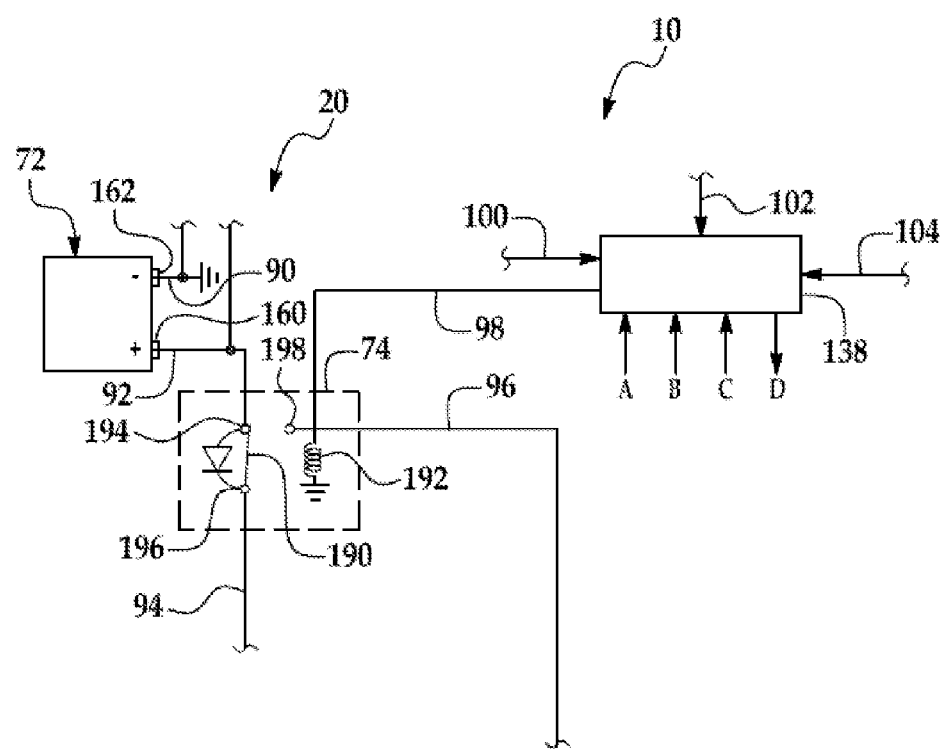
FIG. 2 is a schematic of a portion of the power system of FIG. 1.

Referring to FIGS. 1 and 2, a vehicle 10 having a power system 20 for energizing an electrically heated catalyst 22 in accordance with an exemplary embodiment is provided. The vehicle 10 further includes an engine 30, exhaust pipe sections 32, 34, 36, 38, an oxidation catalyst 50, a urea injector 51, and a SCR catalyst 52.

The engine 30 is provided to supply mechanical power for movement of the vehicle 10. The engine 30 produces exhaust gases 31 that flow through the exhaust pipe sections 32, 34, the electrically heated catalyst 22, the oxidation catalyst 50, the exhaust pipe section 36, the SCR catalyst 52, and the exhaust pipe section 38.

As shown, the exhaust pipe section 32 is coupled between the engine 30 and the exhaust pipe section 34. Also, the electrically heated catalyst 22 is coupled between the exhaust pipe section 34 and the oxidation catalyst 50. The exhaust pipe section 36 is coupled between the oxidation catalyst 50 and the SCR catalyst 52. Finally, the SCR catalyst 52 is coupled to the exhaust pipe section 38.

When the electrically heated catalyst 22 is energized, the catalyst 22 is heated by an electrical current flowing therethrough such that an oxidation of excess carbon monoxide (CO) and hydrocarbons (HC) in the exhaust gases 31 occurs in the catalyst 22 to further increase a temperature of the catalyst 22 and a temperature of exhaust gases flowing therethrough. The carbon monoxide (CO) and hydrocarbons (HC) in the exhaust gases 31 are then further oxidized in the oxidation catalyst 50. Further, the SCR catalyst 52 reduces $NO_x$ in the exhaust gases 31.

The power system 20 is provided to energize the electrically heated catalyst 22 and to electrically charge a battery 72. The power system 20 includes a generator 70, the battery 72, a switching device 74, conductors 90, 92, 94, 96, 98, 100, 102, 104, 106, a voltage sensor 118, a temperature sensor 120, a brake sensor 130, an RPM sensor 132, a temperature sensor 134, a $NO_x$ sensor 136, and a controller 138.

The generator 70 is configured to generate a voltage (e.g., a DC voltage) that is received at the positive terminal 160 of the battery 72. In particular, the generator 70 generates an AC voltage when the engine 30 turns a rotor of the generator 70, and then the generator 70 utilizes an internal voltage regulator 150 to convert the AC voltage to a DC voltage that is applied to the conductor 94. In one exemplary embodiment, the generator 70 outputs a DC voltage that is adjustable by control signals from the controller 138, within a range of 0-24 volts for example. In another exemplary embodiment, the generator 70 outputs 24 volts DC when energizing the electrically heated catalyst 22.

The battery 72 has a positive terminal 160 and a negative terminal 162 and is configured to output a first voltage, such as 12 volts for example, between the terminals 160, 162. The positive terminal 160 is coupled to the conductor 92, and the negative terminal 162 is coupled to the conductor 90. In an alternative embodiment, the battery 72 could output voltages less than 12 volts or greater than 12 volts.

The switching device 74 is electrically coupled between the generator 70 and either the battery 72 or the electrically heated catalyst 22. The switching device 74 has a first operational state (shown in FIG. 1) such that a voltage from the generator 70 is applied through the switching device 74 to the electrically heated catalyst 22. Also, the switching device 74 has a second operational state (shown in FIG. 2) such that the voltage of the generator 70 is not applied through the switching device 74 to the electrically heated catalyst 22. Instead, when the switching device 74 has the second operational state (shown in FIG. 2) a voltage from the generator 70 is applied through the conductor 94, the switching device 74, and the conductor 92 to the battery 72.

The switching device 74 includes a switch 190, an internal coil 192, and nodes 194, 196, 198. The switch 190 is coupled to the node 196 and is actuated between a first operational position in which the switch 190 is electrically connected between the nodes 196, 198, and a second operational position in which the switch 190 is electrically connected between the nodes 196, 194, by energization and de-energization, respectively, of the internal coil 192. The node 194 is electrically coupled to the positive terminal 160 of the battery 72 via the conductor 92. Also, the node 196 is electrically coupled to the generator 70 via the conductor 94, and the node 198 is electrically coupled to the electrically heated catalyst 22 via the conductor 96.

The voltage sensor 118 is coupled to the positive terminal 160 and the negative terminal 162 of the battery 72 via the conductors 92, 90, respectively. The voltage sensor 118 is configured to generate a voltage level signal indicative of an output voltage level of the battery 72. The voltage sensor 118 sends the voltage level signal to the controller 138 via the conductor 100. The controller 138 is configured to determine a state-of-charge of the battery 72 based on the voltage level signal.

The temperature sensor 120 is configured to generate a temperature signal indicative of a temperature level of the electrically heated catalyst 22. The temperature sensor 120 is disposed proximate to the catalyst 22 and communicates with the controller 138 via the conductor 106.

The temperature sensor 134 is configured to generate a temperature signal indicative of a temperature level of exhaust gases downstream of the oxidation catalyst 50 that are entering the SCR catalyst 52. The temperature sensor 134 communicates with the controller 138 via the conductor 108.

The brake sensor 130 is configured to generate a brake signal when a vehicle brake (not shown) is depressed by an operator. The brake sensor 130 communicates with the controller 138 via the conductor 102. The controller 138 can determine an amount of deceleration of the vehicle 10 based on the brake signal from the brake sensor 130. The brake sensor 130 is an optional sensor.

The RPM sensor 132 is configured to generate an RPM signal that is indicative of an RPM level of the engine 30. The RPM sensor 132 communicates with the controller 138 via the conductor 104. The controller 138 can determine an amount of deceleration of the vehicle 10 based on the RPM signal from the RPM sensor 132. The RPM sensor 132 is an optional sensor.

The $NO_x$ sensor 136 is configured to generate a $NO_x$ signal indicative of a $NO_x$ level in exhaust gases exiting the oxidation catalyst 50. The $NO_x$ sensor 136 communicates with the controller 138 via the conductor 110. The controller 138 is configured to determine whether to generate a signal to induce the urea injector 51 to inject urea into the exhaust gases 31 upstream of the SCR catalyst 52 based on the $NO_x$ signal.

The controller 138 is configured to control the operation of the engine 30, the generator 70, the switching device 74, the urea injector 51, and the electrically heated catalyst 22, as will be explained in greater detail below. In one exemplary embodiment, the controller 138 is a microprocessor. However, in an alternative embodiment, the controller 138 may be a solid-state circuit.

Figure 3:
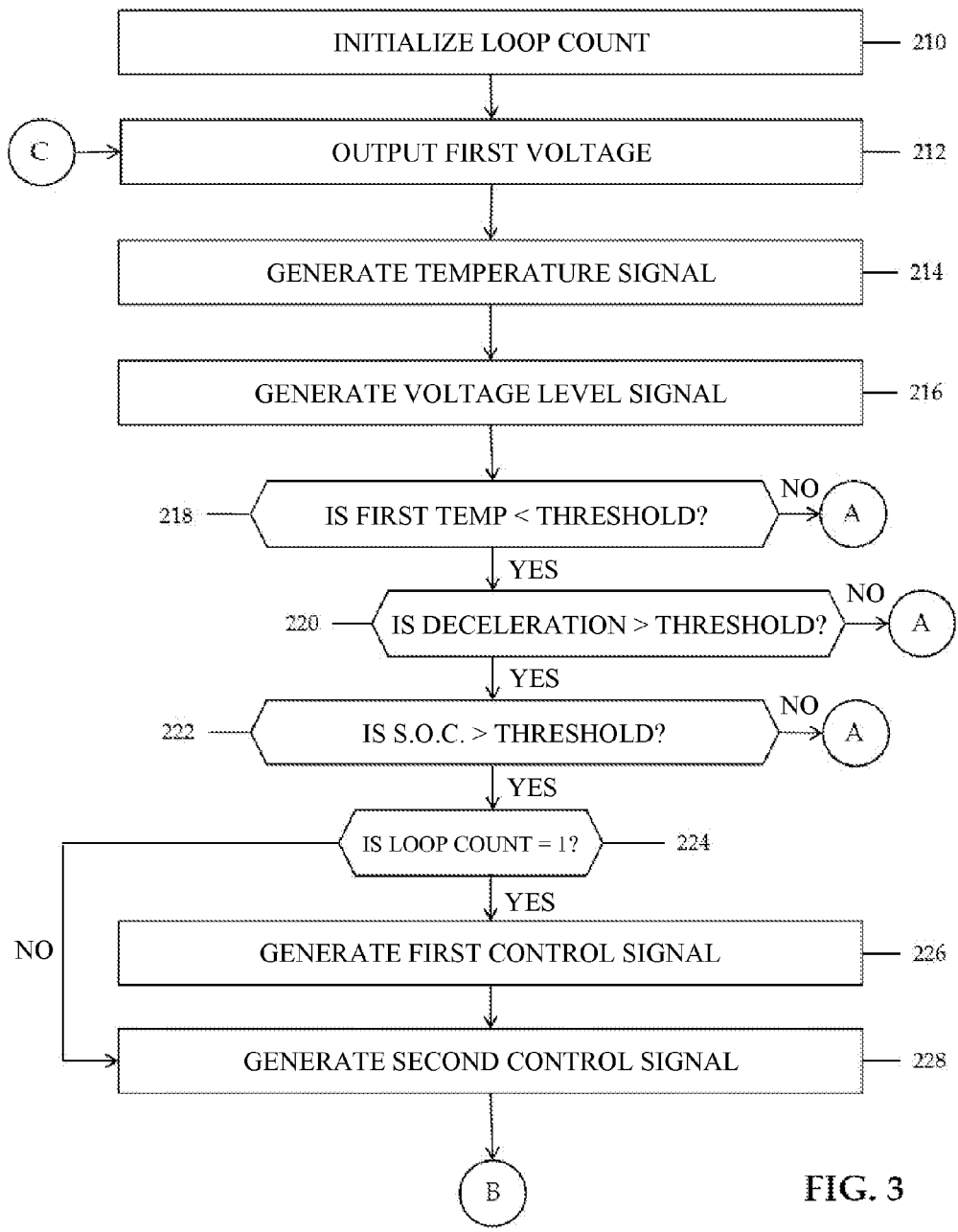
FIGS. 3-5 are flow diagrams of a method for energizing an electrically heated catalyst in accordance with another exemplary embodiment of the invention.
Figure 4:
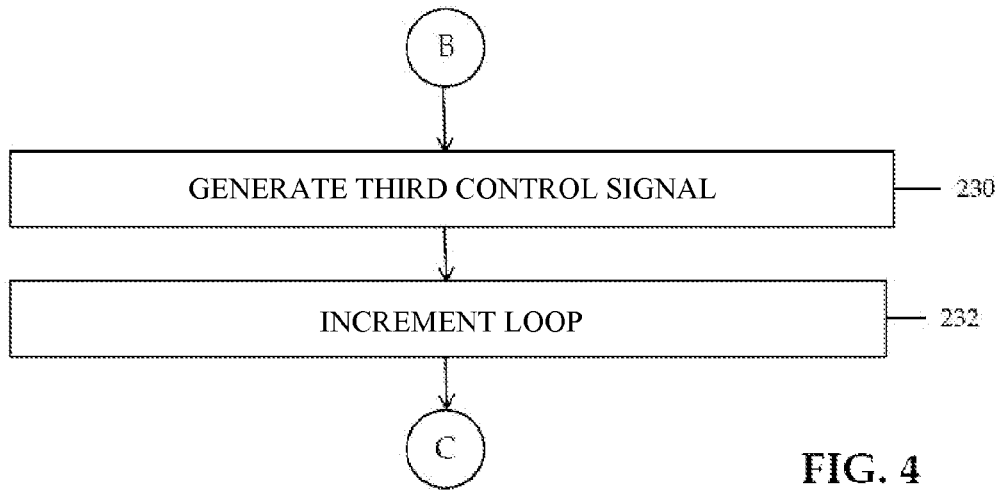
Figure 5:
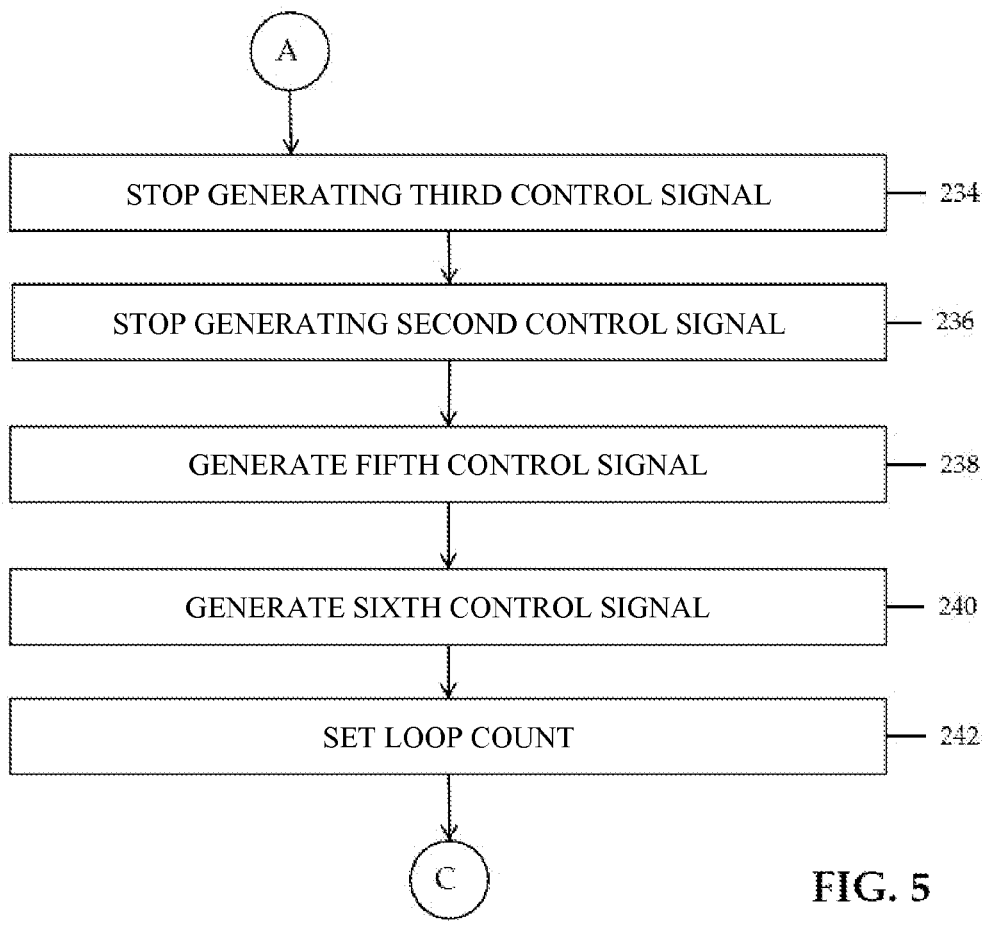

Referring to FIGS. 3-5, flow diagrams of a method for energizing the electrically heated catalyst 22 in accordance with another exemplary embodiment is provided. The controller 138 can implement the following method by executing software algorithms that are stored in a non-volatile memory of the controller 138.

At step 210, the controller 138 initializes a loop count to a value of 1. After step 210, the method advances to step 212.

At step 212, the battery 72 outputs a first voltage. In one exemplary embodiment, the first voltage is 12 volts DC. Of course, in an alternative embodiment, the first voltage can be less than or greater than 12 volts DC. After step 212, the method advances to step 214.

At step 214, the temperature sensor 134 generates a temperature signal indicative of a first temperature level downstream of the electrically heated catalyst 22. The electrically heated catalyst 22 is disposed downstream of the engine 30 and upstream of the oxidation catalyst 50. After step 214, the method advances to step 216.

At step 216, the voltage sensor 118 generates a voltage level signal indicative of a level of the first voltage, and further indicative of a state-of-charge of the battery 72. After step 216, the method advances to step 218.

At step 218, the controller 138 makes a determination as to whether the first temperature level is less than a threshold temperature level. In one exemplary embodiment, the threshold temperature level is 200 degrees Celsius. Of course, in an alternative embodiment, the threshold temperature level could be less than or greater than 200 degrees Celsius. If the value of step 218 equals "yes", the method advances to step 220. Otherwise, the method advances to step 234.

At step 220, the controller 138 makes a determination as to whether an engine deceleration rate is greater than a deceleration rate threshold. In one exemplary embodiment, the controller 138 determines the engine deceleration rate based on the brake signal from the brake sensor 130. In another exemplary embodiment, the controller 138 determines the engine deceleration rate based upon the RPM signal from the RPM sensor 132. If the value of step 220 equals "yes", the method advances step 222. Otherwise, the method advances to step 234.

At step 222, the controller 138 makes a determination as to whether the state-of charge of the battery 72 is greater than a threshold state-of-charge. In one exemplary embodiment, the controller 138 determines the state of charge of the battery 72 based upon the voltage signal from the voltage sensor 118. If the value of step 222 equals "yes", the method advances to step 224. Otherwise, the method advances to step 234.

At step 224, the controller 138 makes a determination as to whether the loop count is equal to the value of 1. If the value of step 224 equals "yes", the method advances to step 226. Otherwise, the method advances to step 228.

At step 226, the controller 138 generates a first control signal to induce the generator 70 to stop outputting a second voltage being supplied to the battery 72. The second voltage is substantially equal to the first voltage. After step 226, the method advances to step 228.

At step 228, the controller 138 generates a second control signal to set the switching device 74 to a first operational state such that the generator 70 is electrically coupled through the switching device 74 to the electrically heated catalyst 22. After step 228, the method advances to step 230.

At step 230, the controller 138 generates a third control signal to induce the generator 70 to output a third voltage that is applied through the switching device 74 in the first operational state to the electrically heated catalyst 22 to increase a temperature of the electrically heated catalyst 22. The third voltage is greater than the second voltage. In one exemplary embodiment, the third voltage is 24 volts DC. Of course, in an alternative embodiment, the third voltage can be less than or greater than 24 volts DC. After step 230, the method advances the step 232.

At step 232, the controller 138 increments the loop count by 1. After step 232, the method returns to step 212.

Referring again to steps 218, 220, 222, if the value of any of these steps equals "no", the method advances to step 234.

At step 234, the controller 138 stops generating the third control signal to induce the generator 70 to stop outputting the third voltage being supplied to the electrically heated catalyst 22. After step 234, the method advances to step 236.

At step 236, the controller 138 stops generating the second control signal to set the switching device 74 to a second operational state such that the generator 70 is electrically coupled through the switching device 74 to the battery 72. After step 236, the method advances step 238.

At step 238, the controller 138 generates a fifth control signal to induce the generator 70 to output the second voltage that is supplied though the switching device 74 to the battery 72. After step 238, the method advances to step 240.

At step 240, the controller 138 generates a sixth control signal to induce the engine 30 to have delayed fuel injection operation therein to increase a temperature of the oxidation catalyst 50. After step 240, the method advances to step 242.

At step 242, the controller 138 sets the loop count equal to a value of 1. After step 242, the method returns to step 212.

The power system and the method for energizing the electrically heated catalyst 22 provide a substantial advantage over other systems and methods. In particular, the power system and method provide a technical effect of increasing a temperature of electrically heated catalyst during engine deceleration.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A power system for energizing an electrically heated catalyst, the electrically heated catalyst being disposed downstream of an engine for receiving exhaust gases from the engine and being disposed upstream of an oxidation catalyst for providing the exhaust gases to the oxidation catalyst, the power system comprising:

a battery configured to output a first voltage;
a generator selectively coupled through a switching device to either the battery or the electrically heated catalyst;
a controller configured to generate a first control signal to set the switching device to a first operational state if a first temperature level of the exhaust gases downstream of the electrically heated catalyst is less than a threshold temperature level and a deceleration rate of the engine is greater than a deceleration rate threshold; and
the controller further configured to generate a second control signal to induce the generator to output a second voltage if the first temperature level of the exhaust gases is less than the threshold temperature level and the deceleration rate of the engine is greater than the deceleration rate threshold;
wherein the first operational state is characterized by the generator being electrically coupled through the switching device to the electrically heated catalyst such that the second voltage is applied through the switching device in the first operational state to the electrically heated catalyst to increase a temperature of the electrically heated catalyst;
the controller further configured to set the switching device to a second operational state if either the first temperature level of the exhaust gases downstream of the electrically heated catalyst is greater than the threshold temperature level or the deceleration rate of the engine is less than the deceleration rate threshold or a state-of-charge of the battery is less than a threshold state-of-charge;
wherein the second operational state is characterized by the generator being electrically coupled through the switching device to the battery such that the second voltage is applied through the switching device in the second operational state to the battery;
such that the generator is electrically coupled to the battery whenever the first temperature level of the exhaust gases downstream of the electrically heated catalyst is greater than the threshold temperature level or the deceleration rate of the engine is less than the deceleration rate threshold or the state-of-charge of the battery is less than the threshold state-of-charge; and
such that the generator is electrically coupled to the electrically heated catalyst only when the first temperature level of the exhaust gases downstream of the electrically heated catalyst is less than the threshold temperature level and the deceleration rate of the engine is greater than the deceleration rate threshold and the state-of-charge of the battery is greater than the threshold state-of-charge.

2. The power system of claim 1, wherein the controller is further configured to generate a third control signal to induce the generator to stop outputting the second voltage before generating the first control signal, if the first temperature level is less than the threshold temperature level and the engine is being decelerated.

3. The power system of claim 1, further comprising a temperature sensor configured to generate a temperature signal indicative of the first temperature level downstream of the electrically heated catalyst.

4. The power system of claim 1, further comprising:
a voltage sensor configured to generate a first voltage level signal indicative of a level of the first voltage; and
the controller further configured to determine the state-of-charge of the battery based on the first voltage level signal.

5. The power system of claim 4, wherein:
the controller is configured to generate the first control signal if the first temperature level is less than the threshold temperature level, and the engine is being decelerated, and the state-of charge of the battery is greater than a threshold state-of-charge; and
the controller is configured to generate the second control signal if the first temperature level is less than the threshold temperature level and the engine is being decelerated, and the state-of charge of the battery is greater than the threshold state-of-charge.

6. The power system of claim 1, wherein the controller is further configured to stop generating the first and second control signals if the first temperature level is greater than or equal to the threshold temperature level.

7. A method for energizing an electrically heated catalyst, the electrically heated catalyst being disposed downstream of an engine for receiving exhaust gases from the engine and being disposed upstream of an oxidation catalyst for providing the exhaust gases to the oxidation catalyst, the method comprising:
outputting a first voltage from a battery;
generating a first control signal utilizing a controller to set a switching device to a first operational state if a first temperature level of the exhaust gases downstream of the electrically heated catalyst is less than a threshold temperature level and a deceleration rate of the engine is greater than a deceleration rate threshold; and
generating a second control signal utilizing the controller to induce a generator to output a second voltage if the first temperature level of the exhaust gases is less than the threshold temperature level and the deceleration rate of the engine is greater than the deceleration rate threshold;
wherein the first operational state is characterized by the generator being electrically coupled through the switching device to the electrically heated catalyst such that the second voltage is applied through the switching device in a first operational state to the electrically heated catalyst to increase a temperature of the electrically heated catalyst;
further comprising setting the switching device to a second operational state if either the first temperature level of the exhaust gases downstream of the electrically heated catalyst is greater than the threshold temperature level or the deceleration rate of the engine is less than the deceleration rate threshold or a state-of-charge of the battery is less than a threshold state-of-charge;
wherein the second operational state is characterized by the generator being electrically coupled through the switching device to the battery such that the second voltage is applied through the switching device in the second operational state to the battery;
such that the generator is electrically coupled to the battery whenever the first temperature level of the exhaust gases downstream of the electrically heated catalyst is greater than the threshold temperature level or the deceleration rate of the engine is less than the deceleration rate threshold or the state-of-charge of the battery is less than the threshold state-of-charge; and
such that the generator is electrically coupled to the electrically heated catalyst only when the first temperature level of the exhaust gases downstream of the electrically heated catalyst is less than the threshold temperature level and the deceleration rate of the engine is greater than the deceleration rate threshold and the state-of-charge of the battery is greater than the threshold state-of-charge.

8. The method of claim 7, further comprising:
generating a third control signal utilizing the controller to induce the generator to stop outputting the second voltage before generating the first control signal, if the first temperature level is less than the threshold temperature level and the engine is being decelerated.

9. The method of claim 7, further comprising generating a temperature signal indicative of the first temperature level downstream of the electrically heated catalyst utilizing a temperature sensor.

10. The method of claim 7, further comprising:
generating a first voltage level signal indicative of a level of the first voltage utilizing a voltage sensor; and
determining the state-of-charge of the battery based on the first voltage level signal utilizing the controller.

11. The method of claim 10, further comprising:
generating the first control signal utilizing the controller if the first temperature level is less than the threshold temperature level, and the engine is being decelerated, and the state-of charge of the battery is greater than a threshold state-of-charge; and
generating the second control signal utilizing the controller if the first temperature level is less than the threshold temperature level and the engine is being decelerated, and the state-of charge of the battery is greater than the threshold state-of-charge.

12. The method of claim 7, further comprising:
stopping the generation of the first and second control signals if the first temperature level is greater than or equal to the threshold temperature level.

13. The power system of claim 1, wherein the controller is further configured to induce the generator to output a third voltage when the switching device is in the first operational state, the third voltage being applied through the switching device in the first operational state to the electrically heated catalyst, and the third voltage being greater than the second voltage.

14. The method of claim 7, further comprising inducing the generator to output a third voltage when the switching device is in the first operational state, the third voltage being applied through the switching device in the first operational state to the electrically heated catalyst, and the third voltage being greater than the second voltage.

15. The power system of claim 1, wherein the controller is further configured to induce the engine in the second operational state to have delayed fuel injection operation so as to increase a temperature of the oxidation catalyst.

16. The method of claim 7, further comprising inducing the engine in the second operational state to have delayed fuel injection operation so as to increase a temperature of the oxidation catalyst.

* * * * *